US012732434B2

(12) United States Patent
Glozman et al.

(10) Patent No.: US 12,732,434 B2
(45) Date of Patent: Sep. 8, 2026

(54) SYSTEM, METHOD, AND COMPUTER PROGRAM FOR INTENT-BASED COMMUNICATION SERVICE ORCHESTRATION WITH GENERATIVE AI ASSISTANCE

(71) Applicant: Amdocs Development Limited, Limassol (CY)

(72) Inventors: Borislav Glozman, Ramat Gan (IL); Roy Segal, Mishmar-David (IL); Avi Chapnick, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 4 days.

(21) Appl. No.: 18/739,134

(22) Filed: Jun. 10, 2024

(65) Prior Publication Data

US 2025/0379795 A1 Dec. 11, 2025

(51) Int. Cl.

| | |
|---|---|
| ***H04L 41/16*** | (2022.01) |
| ***G06F 40/30*** | (2020.01) |
| ***G06F 40/58*** | (2020.01) |
| ***H04L 41/5003*** | (2022.01) |

(52) U.S. Cl.

CPC .............. *H04L 41/16* (2013.01); *G06F 40/30* (2020.01); *G06F 40/58* (2020.01); *H04L 41/5003* (2013.01)

(58) Field of Classification Search

CPC ..... H04L 41/16; H04L 41/5003; G06F 40/30; G06F 40/58

See application file for complete search history.

(56) References Cited

U.S. PATENT DOCUMENTS

| | | | | |
|---|---|---|---|---|
| 12,223,456 | B1 * | 2/2025 | Manohar | G06F 40/30 |
| 12,238,213 | B1 * | 2/2025 | Naanaa | G06Q 10/063112 |
| 2022/0217045 | A1 * | 7/2022 | Blau | H04L 41/0843 |
| 2024/0281457 | A1 * | 8/2024 | de Witte | H04N 21/2187 |
| 2025/0086402 | A1 * | 3/2025 | Xu | G06F 40/30 |
| 2025/0110786 | A1 * | 4/2025 | Schrader | G06F 9/54 |
| 2025/0193244 | A1 * | 6/2025 | Singh | G06F 40/40 |
| 2025/0238470 | A1 * | 7/2025 | Penta | G06F 16/9535 |
| 2025/0315223 | A1 * | 10/2025 | Chlipala | G06F 8/34 |

FOREIGN PATENT DOCUMENTS

CN 118152545 A 6/2024

OTHER PUBLICATIONS

Dandoush, Abdulhalim. “Large Language Models Meet Network Slicing Management and Orchestration” Mar. 20, 2024. Retrieved from <https://arxiv.org/pdf/2403.13721v1> (Year: 2024).*

(Continued)

*Primary Examiner* — Brian J. Gillis
*Assistant Examiner* — Juan C Turriate Gastulo
(74) *Attorney, Agent, or Firm* — Zilka-Kotab, P.C.

(57) ABSTRACT

As described herein, a system, method, and computer program are provided for intent-based communication service orchestration with generative AI assistance. An intent describing properties of a required service is processed, using a large language model (LLM), to translate the intent into a communication service capable of being orchestrated in a network. The communication service is orchestrated in the network.

18 Claims, 4 Drawing Sheets

(56) References Cited

OTHER PUBLICATIONS

International Search Report and Written Opinion from PCT Application No. PCT/IB2025/055869, dated Sep. 17, 2025, 11 pages.

Brodimas et al., "Towards Intent-based Network Management for the 6G System adopting Multimodal Generative AI," European Conference on Networks and Communications & 6G Summit (EuCNC/6G Summit) : Network Softwarisation (NET), 2024,6 pages.

Manais et al., "Towards Intent-Based Network Management: Large Language Models for Intent Extraction in 5G Core Networks," International Conference on the Design of Reliable Communication Networks, 2024, pp. 1-7.

* cited by examiner

SYSTEM, METHOD, AND COMPUTER PROGRAM FOR INTENT-BASED COMMUNICATION SERVICE ORCHESTRATION WITH GENERATIVE AI ASSISTANCE

FIELD OF THE INVENTION

The present invention relates to orchestration of communication services in a network.

BACKGROUND

Intent-based network management and orchestration is one of the prominent tools in the automation of modern networks and services. Several standardization bodies define intent and its handling. However, current solutions for translating intents to communication services are limited. For example, these solutions typically rely on manually defined translation policies, which are prone to errors and are often not sufficiently comprehensive to handle all scenarios.

There is thus a need for addressing these and/or other issues associated with the prior art. For example, there is a need to use generative artificial intelligence (AI) for intent-based communication service orchestration.

SUMMARY

As described herein, a system, method, and computer program are provided for intent-based communication service orchestration with generative AI assistance. An intent describing properties of a required service is processed, using a large language model (LLM), to translate the intent into a communication service capable of being orchestrated in a network. The communication service is orchestrated in the network.

DETAILED DESCRIPTION

Figure 1:
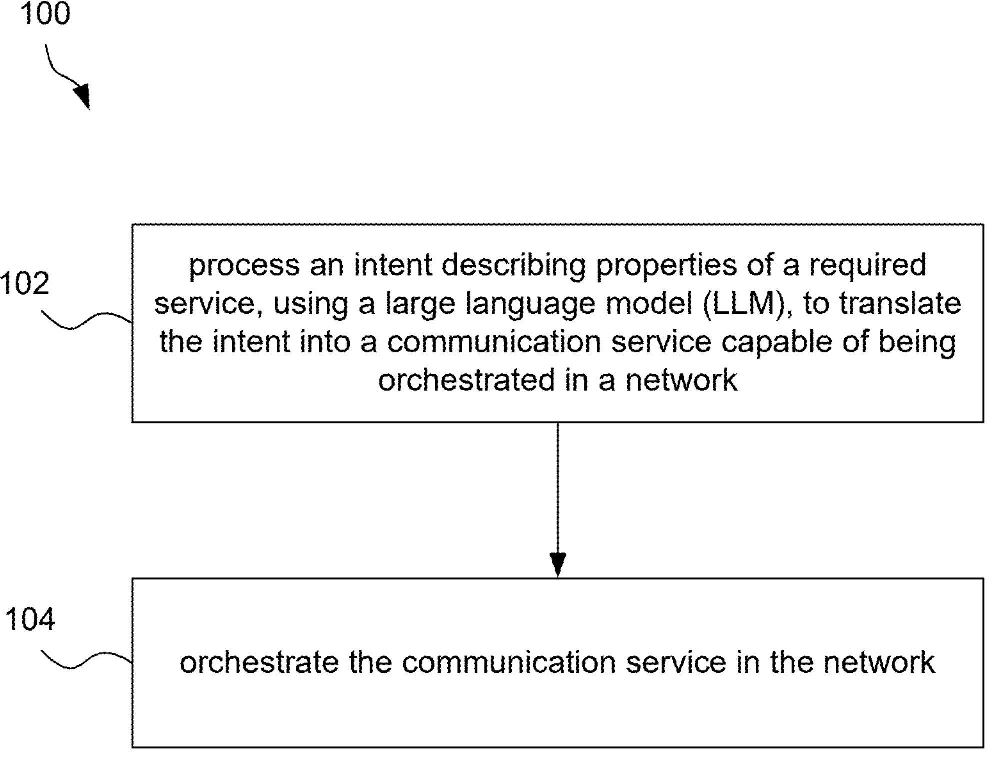
FIG. 1 illustrates a method for using an LLM to translate an intent for a required service to a communication service for orchestration in a network, in accordance with one embodiment.

FIG. 1 illustrates a method 100 for using an LLM to translate an intent for a required service to a communication service for orchestration in a network, in accordance with one embodiment. The method may be carried out by a computer system, such as that described below with respect to FIGS. 3 and/or 4.

In operation 102, an intent describing properties of a required service is processed, using a LLM, to translate the intent into a communication service capable of being orchestrated in a network. With respect to the present embodiment, the intent refers to a non-technical description of a service to be orchestrated in a network. In an embodiment, the intent may be defined in as a natural language input. In an embodiment, the intent may be defined by a user.

As mentioned, the intent describes properties of the required service. The properties may include inputs, functionality, outputs, visual interfaces, etc. In embodiments, the intent may also describe expectations, constraints and/or reports for the required service.

In an embodiment, the intent may be translated by the LLM translating the intent into technical features and further determining a communication service that will fulfill the technical features. This communication service that will fulfill the technical features may in turn by the communication service capable of being orchestrated in the network. The technical features may include technical requirements, capabilities, constraints, and/or policies, in various embodiments.

The communication service refers to a service (e.g. a virtual service) capable of being orchestrated in the network. The communication service may be an application executing on a server in the network, for example. The communication service may connect remote data sources, user devices, other services, etc. via the network.

In an embodiment, the communication service may be comprised of at least one existing service. In other words, the LLM may translate the intent into at least one existing service (i.e. that is already orchestrated in the network or that is defined in an orchestration system). In another embodiment, the communication service may be comprised of at least one new service (i.e. that is not already orchestrated in the network or defined in an orchestration system). In an embodiment, the new service may be designed by the LLM. In yet another embodiment, the communication service may be comprised of a combination of at least one existing service and at least one new service.

With respect to the present description, the LLM is a generative AI model trained to translate given intents to communications services that can be orchestrated in the network. In an embodiment, the LLM may be trained on communication service definitions included in historical data and/or synthetically generated data. In an embodiment, the communication service definitions may be virtual service representations.

The LLM may be configured to use various techniques. In an embodiment, Chain of Thought may be used with the LLM. In another embodiment, Tree of Thought may be used with the LLM. In an embodiment, Retrieval-Augmented Generation (RAG) may be used with the LLM. In an embodiment, the LLM may use a vector database that stores embeddings generated from descriptors of services currently defined in an orchestration system. In an embodiment, the LLM may be aware of existing services and resources in an orchestration system, including their properties, relationships, capabilities, requirements, and policies.

In operation 104, the communication service is orchestrated in the network. In an embodiment, orchestrating the communication service in the network may include initiating a life-cycle-management process for the communication service. In an embodiment, the life-cycle-management process may be performed to fulfill the intent.

In an embodiment, the LLM may be used to decompose the communication service into network services and network resources for fulfillment of the intent. The network services and network resources may then be orchestrated in the network for providing the communication service. In an embodiment, requirements of the intent may be monitored to ensure that fulfillment of the intent continues over time, where as an option the LLM may produce monitoring requirements and measurements and actions for ensuring that fulfillment of the intent continues over time.

To this end, the method 100 provides intent-based communication service orchestration using generative AI. By using generative AI as described above to translate an intent to a communication service, the use of manually defined translation policies may be avoided, to in turn avoid errors in fulfillment of the intent and to speed up fulfillment of the intent.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
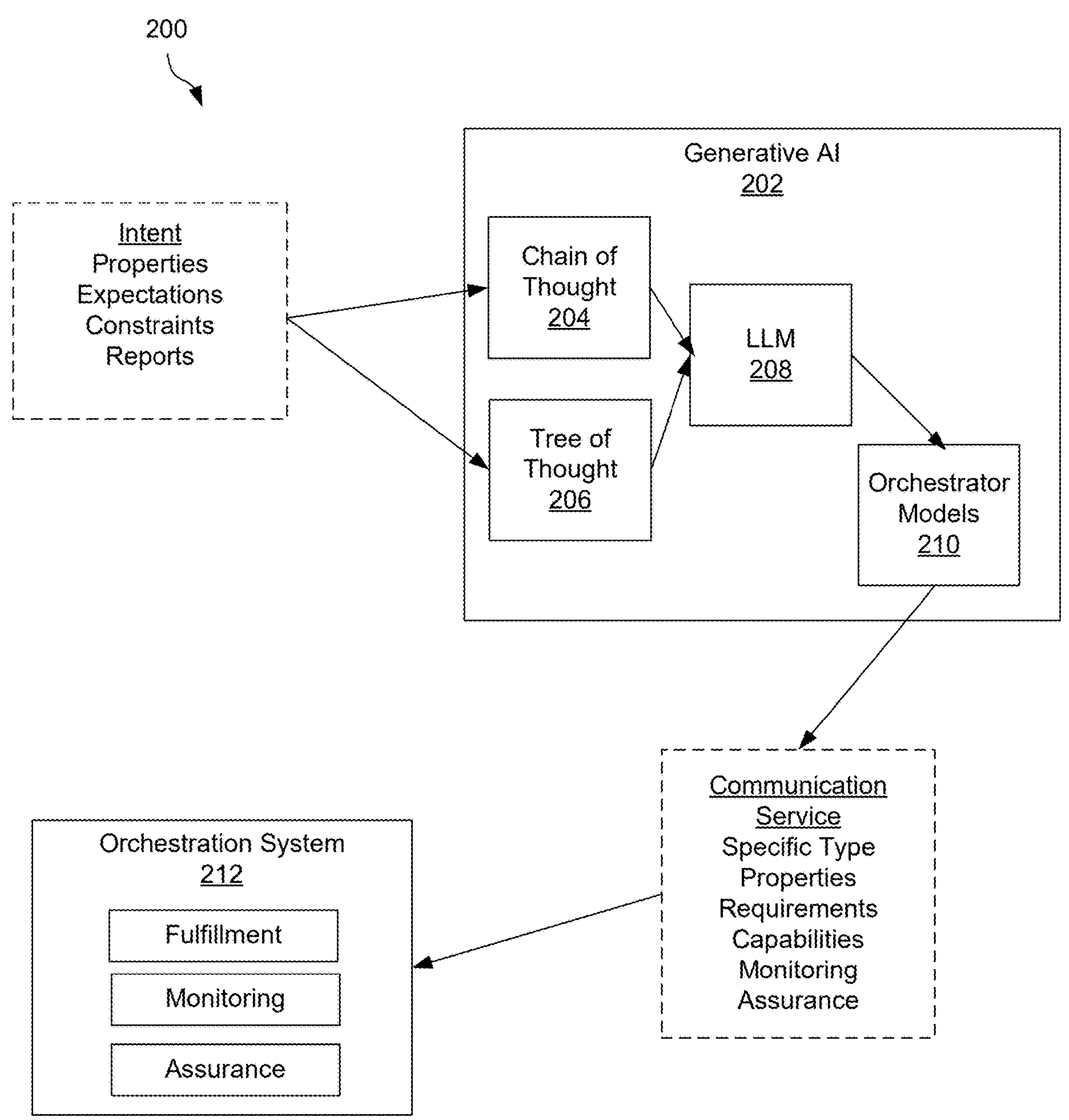
FIG. 2 illustrates a flow diagram of a system for using generative AI to translate an intent for a required service to a communication service for orchestration in a network, in accordance with one embodiment.

FIG. 2 illustrates a flow diagram of a system 200 for using generative AI to translate an intent for a required service to a communication service for orchestration in a network, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a generative AI component 202 which receives as input an intent. The intent is a formal description of a required service (e.g. business, network, etc. service) describing what is requested, rather than how to implement the requested service. Implementation of the intent requires its translation into technical requirements, capabilities, constraints, and policies that are fulfilled by existing or new services.

The generative AI component 202 includes a LLM 208 that performs intent translation into a communication service for its subsequent orchestration by an orchestration system 212. Generative AI techniques such as Chain of Thought 204 and Tree of Thought 206, and even RAG (not shown) can be utilized to make this translation successful, reliable, predictable, explainable, and repeatable.

The LLM 208 is trained on a large set of historical, existing, and synthetically generated communication services definitions (e.g. virtual service representations). In addition, a vector database (not shown) may store embeddings generated from the descriptors of the currently defined services in the orchestration system 212. This vector database may be used for RAG enhancement upon a request that holds an intent for a service.

In an embodiment, the LLM 208 processes the intent with RAG enhancement. Orchestrator models 210 may generate from output of the LLM a properly formatted and syntactically correct communication service. An expected output of the generative AI component 202 is a proper communication service. The process of the generative AI component 202 is structured into steps, with examples, expected outputs, reasoning, etc. Due to the training and the RAG enhancement, the LLM 208 is aware of all the existing services and resources in the orchestration system 212, their properties, relationships, capabilities, requirements, policies, etc., which assist in generation of an optimal communication service for the input intent. The result can be an existing communication service in the orchestration system 212, with specific values for the service instantiation, if such a service is already available, or a communication service newly designed by the LLM 208.

After the communication service is acquired, the orchestration system 212 proceeds with its life-cycle-management, until a successful fulfillment of the intent. During the fulfillment process, the LLM 208 can be used for decomposition of the communication service into network service(s) and network resource(s) in the same manner as described above for a composition of the intent to the communication service. After the intent fulfillment, a report is issued, and the intent requirements are monitored to assure that the intent continues to be fulfilled over time.

Figure 3:
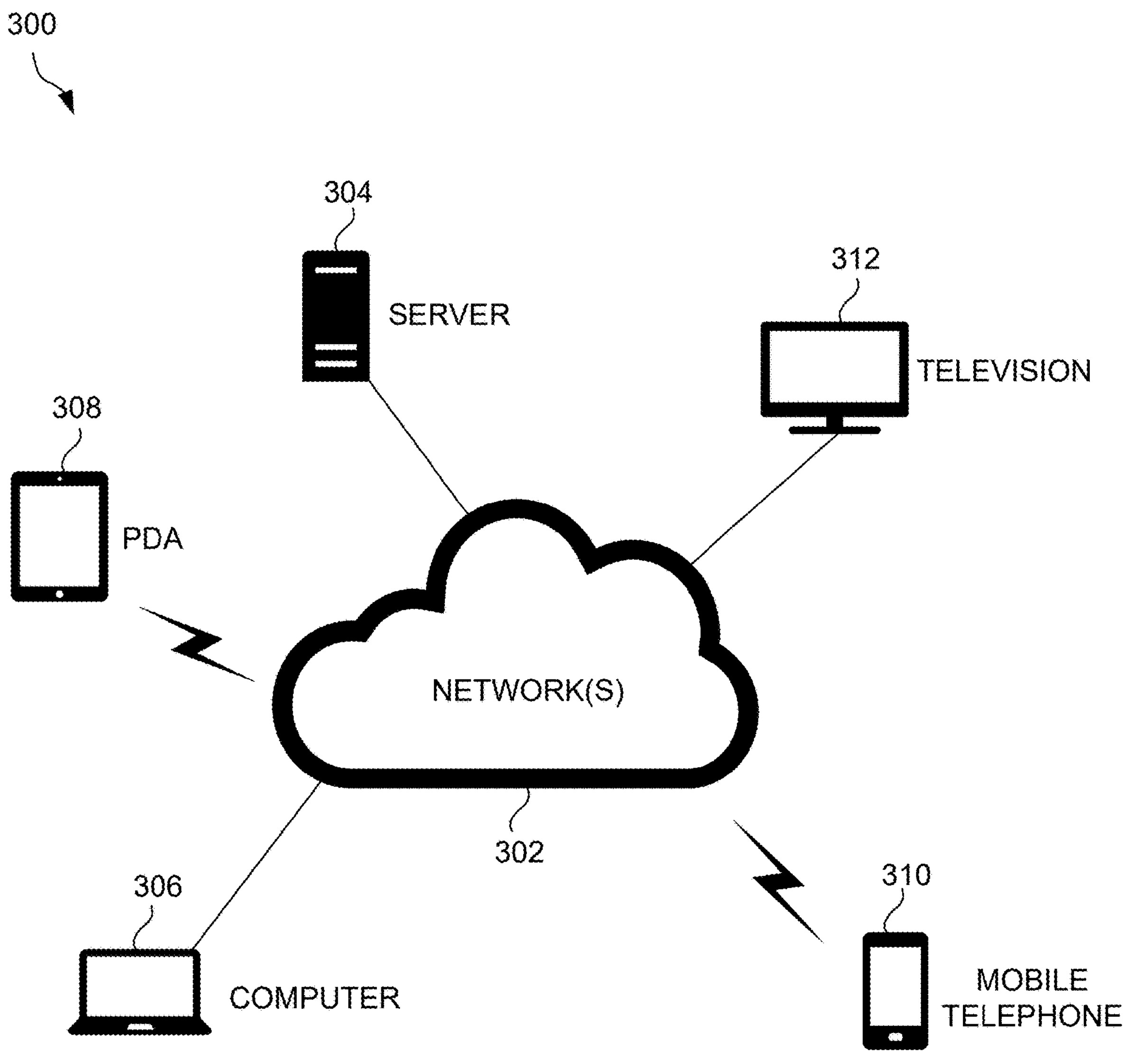
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
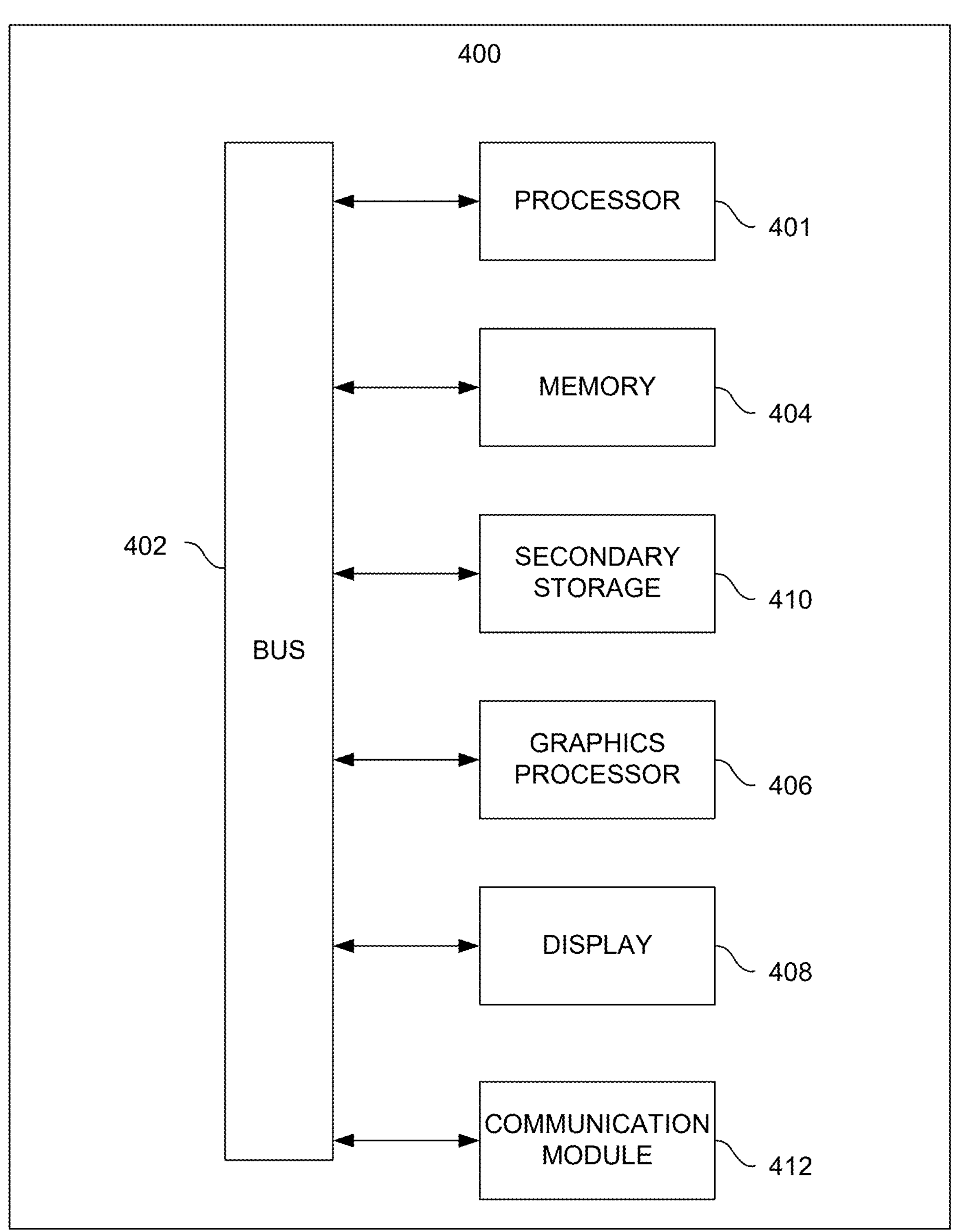
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

receive a natural language input defining an intent for a service to be instantiated in a network, the natural language input describing properties of the service including inputs to the service, functionality of the service, outputs of the service, and visual interfaces of the service;

process the natural language input, using a large language model (LLM), to translate the intent into a communication service capable of being orchestrated in a network;

decompose, by the LLM, the communication service into network services and network resources for fulfillment of the intent;

produce, by the LLM, requirements for ensuring that fulfillment of the intent continues over time;

orchestrate the communication service in the network by orchestrating the network services and network resources in the network; and monitor the requirements of the intent to ensure that fulfillment of the intent continues over time.

2. The non-transitory computer-readable media of claim 1, wherein the intent is translated to the communication service by the LLM:

translating the intent into technical features, and determining a communication service that will fulfill the technical features as the communication service capable of being orchestrated in a network.

3. The non-transitory computer-readable media of claim 2, wherein the technical features include technical requirements, capabilities, constraints, and policies.

4. The non-transitory computer-readable media of claim 1, wherein the communication service is comprised of at least one existing service.

5. The non-transitory computer-readable media of claim 1, wherein the communication service is comprised of at least one new service.

6. The non-transitory computer-readable media of claim 5, wherein the new service is designed by the LLM.

7. The non-transitory computer-readable media of claim 1, wherein Chain of Thought is used with the LLM.

8. The non-transitory computer-readable media of claim 1, wherein Tree of Thought is used with the LLM.

9. The non-transitory computer-readable media of claim 1, wherein Retrieval-Augmented Generation (RAG) is used with the LLM.

10. The non-transitory computer-readable media of claim 1, wherein the LLM is trained on communication service definitions included in at least one of:

historical data, or synthetically generated data.

11. The non-transitory computer-readable media of claim 10, wherein the communication service definitions are virtual service representations.

12. The non-transitory computer-readable media of claim 1, wherein the LLM uses a vector database that stores embeddings generated from descriptors of services currently defined in an orchestration system.

13. The non-transitory computer-readable media of claim 1, wherein the LLM is aware of existing services and resources in an orchestration system, including their properties, relationships, capabilities, requirements, and policies.

14. The non-transitory computer-readable media of claim 1, wherein orchestrating the communication service in the network includes initiating a life-cycle-management process for the communication service.

15. The non-transitory computer-readable media of claim 14, wherein the life-cycle-management process is performed to fulfill the intent.

16. The non-transitory computer-readable media of claim 1, wherein the network services and network resources are orchestrated in the network for providing the communication service.

17. A method, comprising:

at a computer system:

receiving a natural language input defining an intent for a service to be instantiated in a network, the natural language input describing properties of the service including inputs to the service, functionality of the service, outputs of the service, and visual interfaces of the service;

processing the natural language input, using a large language model (LLM), to translate the intent into a communication service capable of being orchestrated in a network;

decomposing, by the LLM, the communication service into network services and network resources for fulfillment of the intent;

producing, by the LLM, requirements for ensuring that fulfillment of the intent continues over time;

orchestrating the communication service in the network by orchestrating the network services and network resources in the network; and monitoring the requirements of the intent to ensure that fulfillment of the intent continues over time.

18. A system, comprising:

a non-transitory memory storing instructions; and one or more processors in communication with the non-transitory memory that execute the instructions to:

receive a natural language input defining an intent for a service to be instantiated in a network, the natural language input describing properties of the service including inputs to the service, functionality of the service, outputs of the service, and visual interfaces of the service;

process the natural language input, using a large language model (LLM), to translate the intent into a communication service capable of being orchestrated in a network;

decompose, by the LLM, the communication service into network services and network resources for fulfillment of the intent;

produce, by the LLM, requirements for ensuring that fulfillment of the intent continues over time;

orchestrate the communication service in the network by orchestrating the network services and network resources in the network; and monitor the requirements of the intent to ensure that fulfillment of the intent continues over time.

* * * * *